United States Patent
Carpenter et al.

(10) Patent No.: US 10,226,819 B2
(45) Date of Patent: Mar. 12, 2019

(54) METHOD OF SURFACE HARDENING SINTERED BODIES BY USING VIBRATIONS

(71) Applicant: SANDVIK INTELLECTUAL PROPERTY AB, Sandviken (SE)

(72) Inventors: Michael Carpenter, Warwickshire (GB); Sarah Geoghegan, Solihull (GB); Eugene Keown, Worcestershire (GB); Jane Smith, Coventry (GB)

(73) Assignee: Sandvik Hyperion AB, Stockholm (SE)

( * ) Notice: Subject to any disclaimer, the term of this patent is extended or adjusted under 35 U.S.C. 154(b) by 734 days.

(21) Appl. No.: 14/383,573

(22) PCT Filed: Mar. 7, 2013

(86) PCT No.: PCT/EP2013/054607
§ 371 (c)(1),
(2) Date: Sep. 8, 2014

(87) PCT Pub. No.: WO2013/135555
PCT Pub. Date: Sep. 19, 2013

(65) Prior Publication Data
US 2015/0098855 A1 Apr. 9, 2015

(30) Foreign Application Priority Data
Mar. 13, 2012 (EP) .................... 12159307

(51) Int. Cl.
*B22F 3/24* (2006.01)
*B24B 31/06* (2006.01)
*B23P 9/00* (2006.01)
*B24B 1/04* (2006.01)
*C22C 1/10* (2006.01)
*C22C 29/08* (2006.01)
(Continued)

(52) U.S. Cl.
CPC ....... *B22F 3/24* (2013.01); *B23P 9/00* (2013.01); *B24B 1/04* (2013.01); *B24B 31/06* (2013.01); *C22C 1/1094* (2013.01); *C22C 29/067* (2013.01); *C22C 29/08* (2013.01); *C22C 32/0052* (2013.01); *B22F 2202/01* (2013.01); *B22F 2998/00* (2013.01); *B22F 2999/00* (2013.01)

(58) Field of Classification Search
CPC ............... B22F 2202/01; B22F 3/24
USPC ........................................... 419/28
See application file for complete search history.

(56) References Cited

U.S. PATENT DOCUMENTS 7,188,993 B1 * 3/2007 Howe ................ B06B 1/161
366/111
2007/0110607 A1 5/2007 Iwasaki
2009/0301764 A1 12/2009 Kawamura et al.
(Continued)

FOREIGN PATENT DOCUMENTS

EP 1287928 A2 3/2003
JP 2002079452 A 3/2002

*Primary Examiner* — Weiping Zhu

(57) ABSTRACT

The present invention relates to a method of surface hardening a plurality of sintered bodies having a hard phase and a binder phase. The method includes the steps of placing the bodies in a container, and forming a system including the container and the bodies therein, and causing the bodies to move and collide with each other and with inside walls of the container. The container is vibrating utilizing a mechanical resonance frequency of the system.

15 Claims, 2 Drawing Sheets

(51) Int. Cl.
*C22C 29/06* (2006.01)
*C22C 32/00* (2006.01)

(56) References Cited

U.S. PATENT DOCUMENTS

2011/0000717 A1* 1/2011 Carlsson ............... C21D 7/04
 175/420.1
2011/0220348 A1 9/2011 Jin et al.

* cited by examiner

METHOD OF SURFACE HARDENING SINTERED BODIES BY USING VIBRATIONS

RELATED APPLICATION DATA

This application is a § 371 National Stage Application of PCT International Application No. PCT/EP2013/05607 filed Mar. 7, 2013 claiming priority of EP Application No. 12159307.3, filed Mar. 13, 2012.

TECHNICAL FIELD

The present invention relates to a method of surface hardening a plurality of sintered bodies comprising a hard phase and a binder phase wherein said method comprises the steps of placing the bodies in a container and thereby forming a system defined by the container and the bodies therein, causing the bodies to move and collide with each other and with inside walls of the container.

BACKGROUND

Components made of a sintered material comprising a hard phase and a binder phase, are used in a wide range of applications, for example in components subjected to extreme wear under abrasive conditions. In the oil, gas and mining industry it is a commonly used material in several important components, from drilling bits to general wear parts. The most important material properties of such components are a combination of high surface hardness and high toughness. Preferably the outer surface shows a high hardness to combat abrasive wear, and the core of the body shows a high toughness to withstand impact damage.

Cemented carbide is an example of such a material comprising tungsten carbide particles in a binder phase of typically cobalt and/or nickel. The manufacturing typically comprises the steps of mixing and wet milling powders of WC and Co to a slurry, spray draying the slurry and press bodies of the spray dried powder to a desired shape. The pressed bodies are sintered to form dense bodies of cemented carbide. The sintered bodies may, due to dimension tolerances, be ground or machined into its final dimensions.

The surface of a sintered cemented carbide body can be treated by a surface hardening method to improve the wear resistance of the body. Traditionally this surface treatment is applied through for example vibration tumbling, centrifugal tumbling or shot peening. Another example of a surface treatment method is cascading, disclosed in US 2005/0053511 and in US 2010/0075122.

These known surface hardening treatments are based on mechanical impact or deformation of the outer surface of the body, such that a mechanical hardening or work hardening zone forms at and just below the surface. During the deformation, dislocations are moving in the material and new dislocations are formed, and dislocations are locking each other whereby an increase in hardness is achieved.

SUMMARY

It is an object of the present invention to provide a method of surface hardening sintered bodies comprising a hard phase and a binder phase, which method is more time and energy efficient than prior art. Another object is to provide a surface hardening method that provides a surface zone with a higher level of hardness than prior art. Further another object is to provide a surface hardening method that provides a hardness increase at a larger depth below the surface of the body compared to prior art. Further another object is to provide an increased toughness compared to prior art.

The present invention relates to a method of surface hardening a plurality of sintered bodies comprising a hard phase and a binder phase. The method comprises the steps of: placing the bodies in a container and thereby forming a system comprising the container and the bodies therein, causing the bodies to move and collide with each other and with inside walls of the container by vibrating the container utilizing a mechanical resonance frequency of the system.

One advantage with the method according to the present invention is the short treatment time required to achieve a surface hardening effect. Another advantage is that the method results in a larger hardness increase and at a larger depth than previously known methods. Furthermore the utilizing of the resonance frequency of the system gives the advantage that the energy consumption is low.

The body of the present invention can be of any shape, for example in the shape of a drill bit insert.

The container is arranged to enclose the bodies to be treated. The container comprises walls and preferably a closable opening through which the bodies can be loaded before the treatment and unload after the treatment. The container can for example be of a cylindrical shape with a closed bottom and a closable top. The closable top is opened during the loading of bodies into the container, and closed during the surface hardening method. The container can be equipped with a lining on its inner walls, made of a material that for example makes the collisions between the bodies and the container walls more elastic. A lining can for example be made of a polymeric material or other suitable material e.g. steel material.

The system defined by the container and the bodies therein can comprise bodies of different shape or size and it can further comprise a medium surrounding the bodies during the treatment, such as a gas or a liquid.

The bodies can be arranged so that they are allowed to move freely during the treatment. Alternatively some bodies can be fixed to a wall of the container and some bodies free moving during the treatment whereby the fixed bodies can be treated only at selected areas.

The suitable number of bodies in the container during one treatment is to be adapted by the person skilled in the art. A large container in a larger equipment can of course process a higher number of bodies compared to a small container in a smaller equipment. The equipment is preferably designed for a specific load and is preferably not overloaded. The free volume in the container needs to be sufficiently large to give space for the bodies to accelerate before a collision. If too few bodies are present in the container during the treatment, the treatment gets less time efficient due to that the collision frequency gets lower and that the throughput is lower. Too many bodies in the container will result in a less efficient process due to a short mean length of the acceleration path. If each body only is allowed to accelerate a very short distance, the energy of each collision will be relatively low. Larger bodies need a larger container. The workload is preferably optimized to the system capacity.

A mechanical resonance, also called natural vibration or self-oscillation, is a general phenomenon of a vibrating system where the amplitude of the vibration becomes significantly amplified at a resonance frequency. At resonance frequency even a weak driving force applied to the system can provide a large amplitude, and hence a high acceleration of the system. The level of the amplification depends on the frequency and reaches a maximum when the frequency is close or equal to the un-sustained systems natural frequency. However, mechanical resonances are typically avoided, since at resonance much energy can be transferred by the driving force to the vibrating system, whereby damages or operation disturbance typically occurs.

In the method according to the present invention, the mechanical resonance is on the other hand utilized to put the system in a very energy efficient vibration mode. The system is forced to vibrate at a frequency at or close to its resonance frequency. This is advantageous in that the bodies inside the container are influenced by the vibrations such that they move and collide with each other with high energy and high acceleration. With the phrase "utilizing the mechanical resonance frequency of the system" is meant that the system is vibrated at a frequency close to the mechanical resonance frequency of the system. With a frequency close to the resonance frequency is meant within +/−0.05 Hz.

To emphasise this, the container is preferably connected to at least one spring and at least one control member. This is advantageous in that the vibrations can be isolated to the system defined by the container, and thus the method can be kept relatively stable and controlled. The container is also preferably equipped with a sensor for continuously measuring the acceleration and to control that the resonance frequency is reached. In one embodiment of the present invention, the resonance frequency is found by continuously increasing or decreasing the frequency and measuring the acceleration, whereby the mechanical resonance frequency for the vibrating system is found. In another embodiment of the present invention the resonance frequency is predefined, for example based on previous experiments and the total weight of the bodies loaded in the container.

The surface hardening method according to the present invention can be performed in a resonant acoustic mixer apparatus. Acoustic mixers are known in the art, see eg. WO2008/088321 and U.S. Pat. No. 7,188,993. Such mixers use low-frequency, high intensity sound energy for mixing.

The sintered body can for example be made of a cermet or a cemented carbide. For example, a TiCN-based cermet can comprise 3-30 weight % of a binder phase mainly composed of Co and/or Ni, also may include Mo and the balance being substantially a hard phase and inevitable impurities. In the TiCN-based cermet, the hard phase is mainly composed of titanium carbide, nitride and/or carbonitride but may also include (Ti,Ta)(C,N), (Ti,W)(C,N), (Ti,Ta)(C,N) and/or (Ti,Ta, W)(C,N).

In one embodiment of the present invention, the sintered bodies are made of cemented carbide. The cemented carbide material can for example comprise 3-20 wt % binder phase of Co and/or Ni and the rest hard phase of WC grains. The grain size of the WC grains can be of any size. In one embodiment the WC mean grain size is preferably a 1-8 µm measured using the linear intercept method. In one embodiment the WC mean grain size is preferably below 1 µm measured using the linear intercept method. The cemented carbide can further comprise hard constitutes selected from borides, carbides, nitrides or carbonitrides of metals from groups 4, 5 or 6 of the periodic table, preferably tungsten, titanium, tantalium, niobium, chromium and vanadium. The grain size of the hard constitutes can have a mean size of below 1 µm and up to 8 µm, depending on the grade application.

In one embodiment of the present invention, the container is vibrated with uniaxial vibrations.

In one embodiment of the present invention, the movements of the bodies originate from the uniaxial vibrations. This is different from the traditional rotating tumbling and the cascading where the bodies get their movements from a radial movement.

In one embodiment of the present invention the vibrations are acoustic vibrations. Acoustic waves are utilized to put the system in resonant condition. The acoustic frequencies are considered to be within the interval 20-20 000 Hz. In another embodiment of the present invention the vibrations has a frequency of 20-80 Hz, preferably 50-70 Hz.

In one embodiment of the present invention the container is vibrating with vibrations having an acceleration of 10-100 G, preferably 30-50 G, most preferably 40 G, where 1 G=9.81 m/s$^2$. The applied acceleration affects the bodies and sets the intensity of the collision. A too high acceleration will affect the bodies negatively due to an increased risk for surface damage and cracks and wear of the surface. A too low acceleration will lead to a less efficient surface hardening method with regards to depth below the surface and the level of reached hardness of the work hardening. With an acceleration set at relatively low values, the method according to the present invention will achieve a surface hardening result similar to a standard hardening method, like for example tumbling. Alternatively, the acceleration can be set at higher values, whereby the method according to the present invention can achieve a surface hardening result similar to a standard hardening method, but in a much reduced time.

The amount of applied energy needed to reach a sufficient effect is dependent on the system and the internal dampening such as losses due to inelastic collisions inside the container and any outer dampening such as losses in springs or dampening elements attached to the outside of the container.

In one embodiment of the present invention the volume of each body is more than 100 mm$^3$. In another embodiment of the present invention the weight of each body is more than 0.01 kg. A too low value of the mass and volume will result in an insufficient acceleration of the bodies thereby the work hardening will be less pronounced.

In one embodiment of the present invention the method is used for surface hardening of cemented carbide bodies for oil, gas or mining applications In one embodiment of the present invention the bodies are drill bit inserts. Drill bits are commonly used in drilling of rock or other very hard and brittle materials.

The present invention also relates to a sintered body comprising a hard phase and a binder phase treated by the method disclosed above.

In one embodiment of the present invention, the sintered body shows a hardness of a first surface zone which is more than 4% higher than a hardness of a bulk zone, wherein the first surface zone extends from the surface of the body and 1 mm below the surface into the body and the bulk zone extends from 5 mm below the surface and into the body, inside said first surface zone. An advantage with this is an improved wear resistance.

In one embodiment of the present invention, the sintered body shows a hardness of a second surface zone which is more than 1.5% higher than the hardness of a bulk zone, wherein the second surface zone extends from the surface of the body and 5 mm below the surface into the body and the bulk zone extends into the body, inside said second surface zone. An advantage with this is an improved wear resistance.

Other objects, advantages and novel features of the invention will become apparent from the following detailed description of the invention when considered in conjunction with the accompanying drawings and claims.

BRIEF DESCRIPTION OF DRAWINGS

Embodiments of the invention will now be described with reference to the accompanying drawings, wherein.

DETAILED DESCRIPTION

In the following, Example 1 discloses samples before any surface hardening treatment, Example 2 describes one example of a method in accordance with one embodiment of the invention and Example 3 and 4 describes a tumbling and high energy tumbling treatments known in the art. Example 5 discloses the results from hardness tests as a function of depths for the samples treated according to the invention as compared to prior art treatment and Example 6 discloses the results from toughness tests. Example 7 discloses a crush test performed on samples treated according to the invention as compared to samples treated according to prior art treatments. Example 8 discloses the change in Coersivity due to treatments according to the present invention.

EXAMPLE 1

Prior Art

Figure 1:
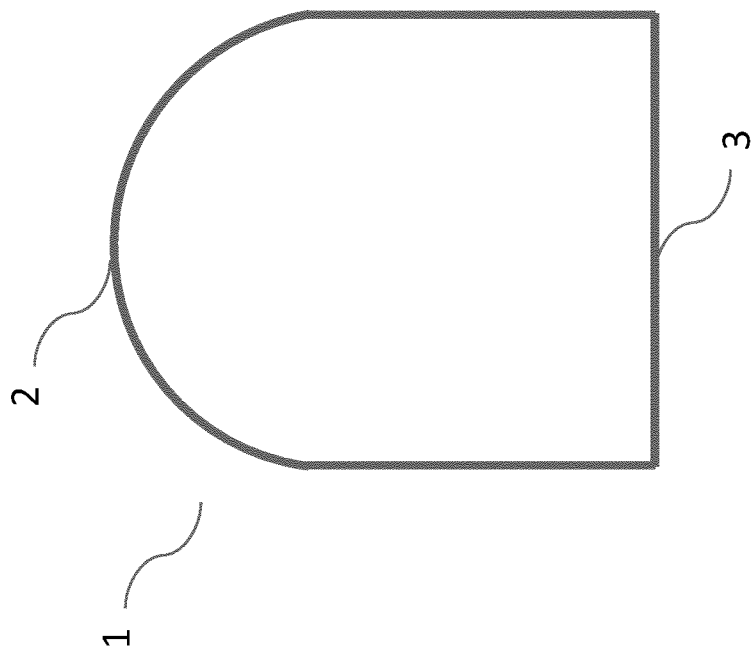
FIG. 1 is a drawing of a drill bit insert.

Samples of cemented carbide comprising the hard phase WC and the binder phase Co were manufactured. Powders of WC and Co were wet milled, spray dried and pressed to bodies of the shape of drill bits. The pressed bodies were GPS sintered at vacuum at a temperature of 1410° C. to dense samples of cemented carbide. Each body was in the form of a bit 1 as shown in FIG. 1, with a cylindrical body with one spherical end 2 and one flat end 3. The size of one body is 15 mm in height and 12 mm in diameter or width. The weight of one sample is about 25 g. The samples were centre less ground using a centre less grinding equipment of Lidköping type.

The samples are characterized and the compositions and properties are shown in Table 1.

The grain size is measured at a polished through cut with mean intercept method in accordance with ISO 4499 and the values presented in Table 1 are mean values.

The hardness is measured with a Vickers indenter at a polished surface in accordance with ISO 3878 using a load of 30 kg.

The porosity is measured in accordance with ISO 4505, which is a method based on studies in light microscope of polished through cuts of the samples. Good levels of porosity are equal to or below A02maxB00C00 using ISO4505 scale.

TABLE 1

Composition and properties of samples tested.

| | Type | | |
|---|---|---|---|
| | A | B | C |
| Co (wt %) | 11 | 10 | 6 |
| WC | Balance | Balance | Balance |
| WC grain size (μm) | 2 | 3 | 3 |
| Hardness (HV30) | 1250 | 1150 | 1270 |
| Porosity | A02maxB00C00 | A02maxB00C00 | A02maxB00C00 |

EXAMPLE 2

Invention

The samples of type A, B and C were treated by a method in accordance with one embodiment of the invention. The samples were treated in an equipment which is aimed for mixing of liquids, powders or slurries, called Resodyn LabRam. This machine is constructed for a load of maximum 500 g. The container aimed for the powder or liquid was loaded with 10 bodies of 25 g each. An "Auto" function was used to reach the resonance frequency within the interval of 58-68 Hz, landing on a frequency of about 60 Hz. The time of treatment was varied as disclosed below. The energy was adjusted such that a maximum acceleration of 20 G, 40 G or 60 G was achieved, wherein 1 G=9.82 m/s$^2$.

EXAMPLE 3

Tumbling

Samples of type A were tumbled in a standard vibration tumbling machine. The tumbling machine is a vibrating machine comprising a bowl that mounts on top of a vibration generator. The tumbling machine is a Sweco model X FMD-3-LR which can be loaded with maximum 70 kg. The number of treated bodies during this example was about 2000 bodies. The frequency was 25 Hz, the acceleration 2 G and the time of tumbling was 2 hours.

EXAMPLE 4

High Energy Tumbling

Samples of type A were treated in a high energy tumbling machine of type Vibro Benz. This is a modified tumbling machine in which the samples are vibrated and move in a spiral motion. This method can also be called cascading. The machine can be loaded with maximum 70 kg. The number of treated bodies during this example was about 2000 bodies. The frequency was 26 Hz, the acceleration 4 G and the time of high energy tumbling was 2 hours.

High-energy tumbling involves placing parts in a barrel. The barrel, which is sealed with a lid, is then rotated on a carousel holding four barrels. While the carousel spins one way, the barrels go the other direction. This creates a powerful centrifugal force that results in a surface treatment of the parts.

EXAMPLE 5

Hardness vs Depth

The surface hardening method according to the present invention was compared to the well known surface hardening method tumbling, and to untreated samples with regards to hardness increase and depth of hardness increase.

Figure 2:
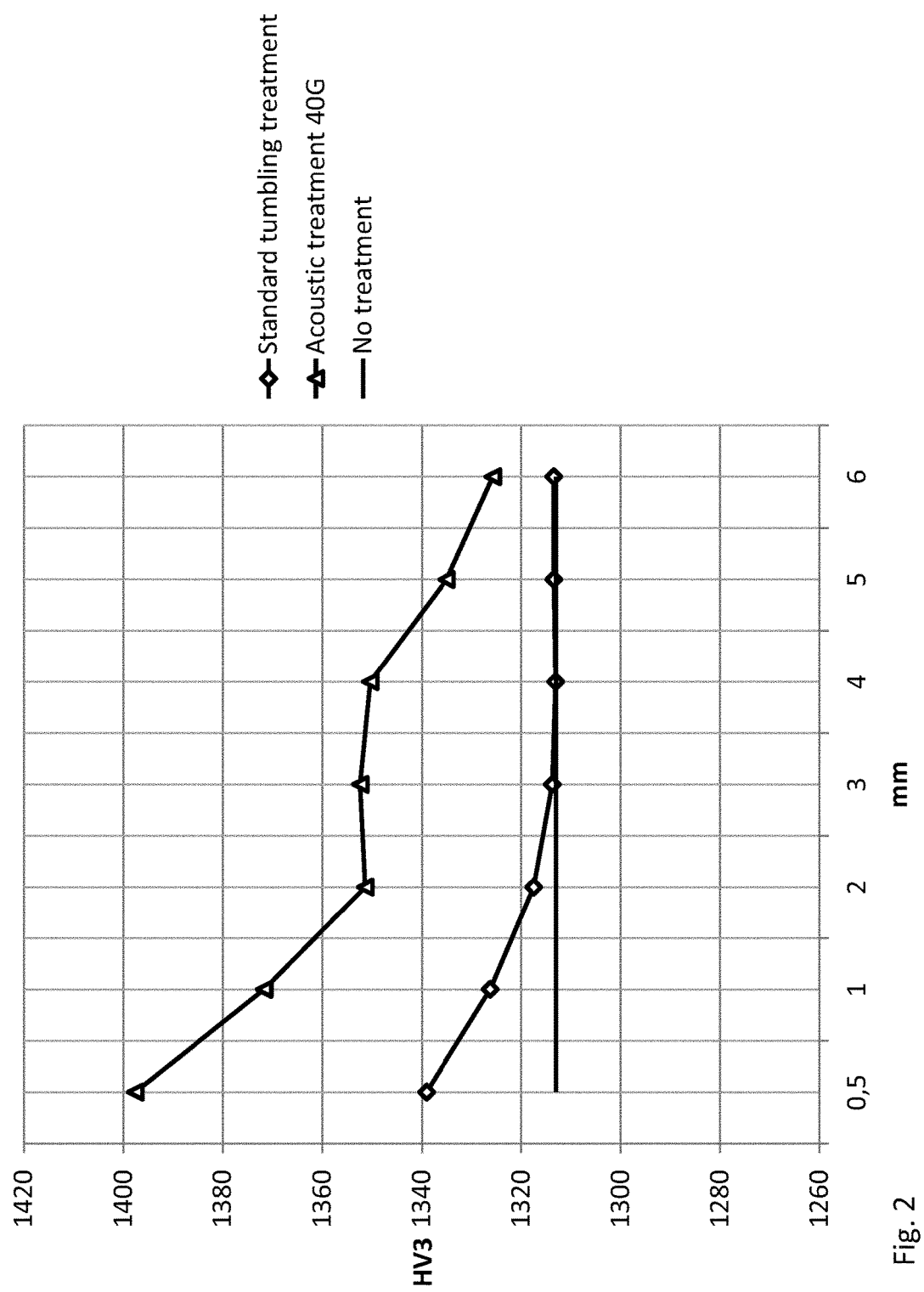
FIG. 2 is a graph of hardness as a function of depth in accordance with Example 5.

Samples of type A were treated with the tumbling disclosed above and in accordance with the invention with 40 G, and compared with an untreated sample. The samples were through cut and polished and the hardness was measured as a function of depth from treated surface with Vickers Hardness tests with a load of 3 kg. The results are presented in Table 2 and shown in FIG. 2.

TABLE 2

Hardness (HV3) as a function of treatment and depth.

| | Distance from surface | | | | | | |
|---|---|---|---|---|---|---|---|
| | 0.5 mm | 1 mm | 2 mm | 3 mm | 4 mm | 5 mm | 6 mm |
| Untreated | 1313 | 1313 | 1313 | 1313 | 1313 | 1313 | 1313 |
| Tumbling (prior art) 2 G, 2 hours | 1339 | 1326 | 1317 | 1314 | 1313 | 1313 | 1313 |
| Invention 40G, 75 min | 1398 | 1372 | 1351 | 1352 | 1350 | 1335 | 1326 |

As shown in Table 2, the samples treated with a surface hardening according to one embodiment of the present invention shows both a higher level of hardness and a larger depth of the hardness incensement. It is notable that the time of treatment is 2 hours for the tumbling treatment compared to 1 hour in accordance with the method according to the invention.

EXAMPLE 6

Toughness

The surface hardening method according to the present invention was compared to the well known surface hardening method tumbling, and to untreated samples with regards to toughness increase. The sample type A was surface hardening treated and the toughness was measured. The toughness was studied based on crack lengths at the corners of Vickers indents made with a load of 100 kg, a so called "Mean Palmquist crack length", and the results are presented in Table 3.

In the surface zone no cracks were detected in a light optical microscope at ×500, whereas in the core zone, at ×500, the crack length were typically 77 μm in a material not subjected to a surface treatment.

TABLE 3

Palmquist crack length (μm)

| Surface treatment | Palmquist crack length (μm) close to treated surface | Palmquist crack length (μm) at core |
|---|---|---|
| Untreated surface, as ground | 77 | 77 |
| Tumbling (prior art) | 33 | 77 |
| Invention 40 G, 75 minutes | 0 | 77 |

EXAMPLE 7

Crush Test

A so called "crush test" was performed by taking a sample placing it between two anvils and applying a continuously increasing load until breakage. The load at failure is then recorded as the maximum compressive strength that the sample can withstand before failure. The tests were done on samples of type A with the geometry as disclosed above, and the results are presented as compressive strength as shown in Table 4.

TABLE 4

Load at breakage

| Surface treatment | Compressive strength (kN) |
|---|---|
| Untreated surface, as ground | 83.32 |
| Tumbling (prior art) | 115.38 |
| High energy tumbling (prior art) | 124.26 |
| Invention 40 G, 75 minutes | 134.72 |
| Invention 60 G, 75 minutes | 141.55 |

EXAMPLE 8

Coercivity

The Coercivity (Hc) is measured with a Foerster equipment suitably calibrated using cemented carbide reference samples. The coercivity is increased by the surface treatment according to the invention, as shown in Table 5.

TABLE 5

Coercivity, (kA/m) of body which is untreated and on body treated according to invention.

| | Type | | |
|---|---|---|---|
| | A | B | C |
| Untreated | 8.2 | 6.0 | 6.8 |
| Invention 40 G, 75 minutes | 9.2 | 7.0 | 7.6 |

As shown in Table 6, the Coercivity level is increasing with treatment time and with acceleration during the treatment.

TABLE 6

Coercivity (kA/m) as a function of treatment time and acceleration for sample of type A.

| | Time treated | | | | |
|---|---|---|---|---|---|
| | 15 min | 30 min | 45 min | 60 min | 75 min |
| Invention 20 G | 8.44 | 8.55 | 8.63 | 8.66 | 8.68 |
| Invention 40 G | 8.66 | 8.84 | 8.97 | 9.09 | 9.21 |
| Invention 60 G | 9.00 | 9.32 | 9.39 | 9.48 | 9.56 |

An advantage with Coercivity measurements is that they can be performed on bodies without the need of any destroying step, as compared to hardness measurements, which requires a through cut. Coercivity measurements can thus be performed as a quantitative step during for example a production line to check that the surface hardening treatment has been sufficient.

While the invention has been described in connection with various exemplary embodiments, it is to be understood that the invention is not to be limited to the disclosed exemplary embodiments, on the contrary, it is intended to cover various modifications and equivalent arrangements within the appended claims.

The invention claimed is:

1. A method of surface hardening a plurality of sintered bodies comprising a hard phase and a binder phase, said method comprising the steps of:
    placing the bodies in a container and forming a system including the container and the bodies therein, each of the bodies having a surface zone and a bulk zone extending below the surface zone; and
    hardening the surface zone of each of the bodies by vibrating the container at a resonance frequency within 0.05 Hz of the resonance frequency of the system to cause the bodies to move and collide with each other and with inside walls of the container,
    wherein the hardened surface zone has a hardness that is greater than a hardness of the bulk zone of the bodies.

2. A method according to claim 1, wherein said hard phase is WC and said binder phase is Co and/or Ni.

3. A method according to claim 1, wherein the container is vibrated with uniaxial vibrations.

4. A method according to claims 3, wherein the movements of the bodies originate from the vibrations.

5. A method according to claim 1, wherein the vibrations are acoustic vibrations.

6. A method according to claim 1, wherein the container is vibrating with vibrations having a frequency of 20-80 Hz.

7. A method according to claim 1, wherein the volume of one body is more than 100 mm$^3$.

8. A method according to claim 1, wherein the weight of one body is more than 0.01 kg.

9. A method according to claim 1, wherein the bodies are sintered cemented carbide bodies for oil, gas or mining applications or drill bit inserts.

10. A method according to claim 1, wherein the container is vibrating with vibrations having an acceleration of 30-100 G, where 1 G=9.81 m/s$^2$.

11. A new method according to claim 1, wherein the surface zone includes a first surface zone that extends from a surface of the body to 1 mm below the surface into the body,
    wherein the bulk zone extends from 5 mm below the surface and into the body, and
    wherein, inside the first surface zone, a hardness of the first surface zone is more than 4% higher than the hardness of the bulk zone.

12. A new method according to claim 11, wherein the surface zone includes a second surface zone, and wherein a hardness of the second surface zone is more than 1.5% higher than the hardness of the bulk zone.

13. A new method according to claim 11, wherein the surface zone includes a second surface zone that extends to 5 mm below the surface into the body, and
    wherein, inside said second surface zone, a hardness of the second surface zone is more than 1.5% higher than the hardness of the bulk zone.

14. A method of surface hardening a plurality of sintered bodies comprising a hard phase and a binder phase, said method comprising the steps of:
    placing the bodies in a container and forming a system including the container and the bodies therein, each of the bodies having a surface zone and a bulk zone extending below the surface zone; and
    hardening the surface zone of each of the bodies by vibrating the container at a frequency at or close to the resonance frequency of the system to cause the bodies to move and collide with each other and with inside walls of the container;
    wherein the container is vibrating with vibrations having an acceleration of 30-100 G, where 1 G=9.81 m/s$^2$, and
    wherein the hardened surface zone has a hardness that is greater than a hardness of the bulk zone of the bodies.

15. A method of surface hardening a plurality of sintered bodies comprising a hard phase and a binder phase, said method comprising the steps of:
    placing the bodies in a container and forming a system including the container and the bodies therein, each of the bodies having a surface zone and a bulk zone extending below the surface zone;
    causing the bodies to move and collide with each other and with inside walls of the container by vibrating the container at a frequency within plus or minus 0.05 Hz of the resonance frequency of the system and wherein the container is vibrating with vibrations having an acceleration of 30-100 G, where 1 G=9.81 m/s$^2$; and
    hardening the surface zone of each of the bodies, the hardened surface zone having a hardness that is greater than a hardness of the bulk zone of the bodies.

* * * * *